(12) United States Patent
Bivens et al.

(10) Patent No.: US 12,240,365 B2
(45) Date of Patent: Mar. 4, 2025

(54) SLEEVE DEVICE FOR A HEADREST

(71) Applicant: Illinois Tool Works Inc., Glenview, IL (US)

(72) Inventors: Steve Bivens, Kankakee, IL (US); Michael A. Tyler, Mokena, IL (US); Taher Rangwala, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 17/889,145

(22) Filed: Aug. 16, 2022

(65) Prior Publication Data

US 2023/0071448 A1    Mar. 9, 2023

Related U.S. Application Data

(60) Provisional application No. 63/241,631, filed on Sep. 8, 2021.

(51) Int. Cl.
  *B60N 2/897* (2018.01)
  *B60N 2/809* (2018.01)

(52) U.S. Cl.
  CPC ............. *B60N 2/897* (2018.02); *B60N 2/809* (2018.02)

(58) Field of Classification Search
  CPC ...................................................... B60N 2/897
  See application file for complete search history.

(56) References Cited

U.S. PATENT DOCUMENTS

| | | | |
|---|---|---|---|
| 5,788,250 A * | 8/1998 | Masters | B60N 2/826 |
| | | | 297/391 |
| 5,816,658 A * | 10/1998 | Wallis | B60N 2/815 |
| | | | 297/391 |
| 5,944,170 A | 8/1999 | Laveine | |
| 6,296,316 B1 * | 10/2001 | Hann | B60N 2/821 |
| | | | 297/391 |
| 7,165,814 B2 | 1/2007 | Gans | |
| 7,370,915 B2 * | 5/2008 | Droche | B60N 2/818 |
| | | | 297/391 |

(Continued)

FOREIGN PATENT DOCUMENTS

| CN | 201961194 U | 9/2011 |
|---|---|---|
| DE | 29801357 U1 | 6/1998 |

(Continued)

OTHER PUBLICATIONS

ISR and WO dated May 2, 2014, PCT/US2013/074376, filed Dec. 11, 2013 (9 pages).
ISR and WO dated May 16, 2022, PCT/US2022/018678, filed Mar. 3, 2022 (10 pages).
EESR dated Jul. 6, 2022, EP 22161251.8-1012 (8 pages).

*Primary Examiner* — David R Dunn
*Assistant Examiner* — Tania Abraham
(74) *Attorney, Agent, or Firm* — McAndrews, Held & Malloy, Ltd.

(57) ABSTRACT

Described is a sleeve device having a sleeve body for insertion into a vehicle frame of a vehicle seat. The sleeve body includes a tubular wall with an inner axial passage configured to receive a rod of a headrest and at least one elastomeric element overmolded to an outer surface of the sleeve device. The elastomeric elements may be provided in the form of ribs, rings, or other shapes. Additionally or alternatively, the sleeve device includes a latching mechanism having one or more flexible tabs configured to limit lateral and/or vertical movement.

20 Claims, 11 Drawing Sheets

(56) References Cited

U.S. PATENT DOCUMENTS

| | | | |
|---|---|---|---|
| 9,902,301 B2 | 2/2018 | Aquillue | |
| 2006/0012225 A1 | 1/2006 | Gans | |
| 2006/0119163 A1 | 6/2006 | Gans | |
| 2015/0329021 A1 | 11/2015 | Aquillue | |
| 2015/0329022 A1* | 11/2015 | Miyaguchi | B60N 2/809 |
| | | | 248/314 |
| 2016/0176324 A1* | 6/2016 | Otto | F16C 33/26 |
| | | | 384/282 |
| 2018/0236911 A1* | 8/2018 | Takeuchi | B60N 2/80 |
| 2019/0092198 A1* | 3/2019 | Inoue | B60N 2/682 |
| 2019/0143865 A1 | 5/2019 | Hagan | |
| 2019/0283641 A1* | 9/2019 | Wehling | B60N 2/809 |
| 2019/0381919 A1* | 12/2019 | Fredriksson | B60N 2/809 |
| 2020/0130549 A1* | 4/2020 | Izumida | B60N 2/00 |
| 2021/0300223 A1 | 9/2021 | Moreno | |
| 2022/0289087 A1 | 9/2022 | Bielsa Bonet | |

FOREIGN PATENT DOCUMENTS

| | | |
|---|---|---|
| DE | 102004052604 B3 | 4/2006 |
| DE | 602006000827 T2 | 4/2009 |
| EP | 0875471 A1 | 11/1998 |
| EP | 1609665 A2 | 12/2005 |
| EP | 1652723 A2 | 5/2006 |
| EP | 2749448 A1 | 7/2014 |
| FR | 2917681 A1 | 12/2008 |
| FR | 2936749 A1 | 4/2010 |
| FR | 3010011 A1 | 3/2015 |
| KR | 20180001205 U | 5/2018 |
| WO | 2015102319 A1 | 7/2015 |
| WO | 2016166009 | 10/2016 |
| WO | 2022187466 | 9/2022 |

\* cited by examiner

FIG. 7e *Detail A*

FIG. 7f *Detail B*

SLEEVE DEVICE FOR A HEADREST

CROSS-REFERENCE

The present application claims the benefit under 35 U.S.C. § 119(e) of U.S. Provisional Patent Application Ser. No. 63/241,631, filed Sep. 8, 2021 and titled "Sleeve Device For A Headrest," the contents of which are hereby incorporated by reference.

FIELD

The present disclosure relates generally to sleeve devices for a headrest, and, more particularly, to sleeve device for an automotive headrest with elastomeric regions.

BACKGROUND

A sleeve device for headrests used in automotive applications typically comprise a tubular body that receives a rod of the headrest, and a head portion that engages with the rod to secure the rod in place. The tubular body is received in a vehicle seat frame, and the head portion sits at or above a cushion of the seat.

Generally, the sleeve device is designed for a specific vehicle seat frame and for a specific configuration of rod, or at least a specific, narrow range of frame and rod configurations. Accordingly, there are many designs of sleeve device available, and a new design of seat and/or rod requires an alteration to the sleeve device design. The interaction between the sleeve device and the rod must be sufficiently tight to reduce buzzing, squeaking, and rattling (BSR), but must also be sufficiently loose to enable the rod to be moveable axially within the sleeve device if a user wishes to alter the height of the headrest. The sleeve device must also fit tightly into the seat frame, to prevent BSR and to ensure that the sleeve device does not become loose during adjustment of the headrest.

Therefore, sleeve devices are typically manufactured within a tight tolerance to achieve the optimum interaction between the sleeve device and the rod, and between the sleeve device and the seat frame. Nevertheless, BSR and difficulty in adjusting the headrest is still common in these components, which can cause annoyance and discomfort to users. Therefore, a need exists for a sleeve device that can be manufactured with lower tolerances while mitigating BSR.

SUMMARY

The present disclosure relates generally to sleeve devices for a headrest, and, more particularly, to sleeve device for an automotive headrest with elastomeric regions, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 3a illustrates a view of the underside of the sleeve device, while

FIG. 4a illustrates a view of the underside of the sleeve device and the vehicle frame, while

FIGS. 5a and 5b illustrate assembled views of the latching mechanism 212 in accordance with aspects of this disclosure, while

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered. Further, throughout the description reference is made to "upper", "above", "lower" and "below, and these terms correspond to the orientation of the sleeve device when in use in ordinary use in an automotive vehicle.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As explained above, difficulty in adjusting the headrest and buzz, squeak, and rattle (BSR) can cause annoyance and discomfort to users. To address these points, disclosed is a sleeve device that can be manufactured with lower tolerances, while mitigating BSR. The illustrative embodiment relates to a sleeve device for a headrest. As will be described, the sleeve device may include elastomeric regions that reduce tolerances and mitigate BSR. While the described sleeve device is generally intended for use in a headrest of an automotive vehicle, the sleeve device can be used with any suitable headrest, for example, those used in aircraft, locomotives, marine vessels, or the like.

In one aspect, a sleeve device for a headrest comprising a sleeve body for insertion into a vehicle frame of a vehicle seat comprises: a tubular wall defining inner axial passage configured to receive a rod of the headrest; and at least one elastomeric element overmolded or attached to an outer surface of the sleeve device. In some examples, the at least one elastomeric element is formed or otherwise positioned on the tubular wall and configured to engage the vehicle frame when assembled. In some examples, the at least one elastomeric element is formed or otherwise positioned on the tubular wall and configured to apply an inward force upon one or more flex fingers. The at least one elastomeric element may be ring-shaped. In some examples, the sleeve body comprises a guide extending from the tubular wall, wherein the at least one elastomeric element is formed on the guide and configured to engage the vehicle frame when assembled. In some examples, the sleeve body comprises a flange, wherein the at least one elastomeric element is formed on the flange and configured to engage the vehicle frame when assembled. In some examples, the at least one elastomeric element comprises a plurality of crush ribs. In some examples, the sleeve device further comprises a head portion located at an end of the tubular wall, the head portion extending radially outwardly from the tubular wall and configured to engage with the rod. The head portion may engage with the rod via a latching mechanism having a body portion and a spring element. The body portion may comprise one or more flexible tabs. In some examples, the one or more flexible tabs comprises a first flexible tab configured to limit lateral movement and a second flexible tab configured to limit vertical movement.

Figure 1A:
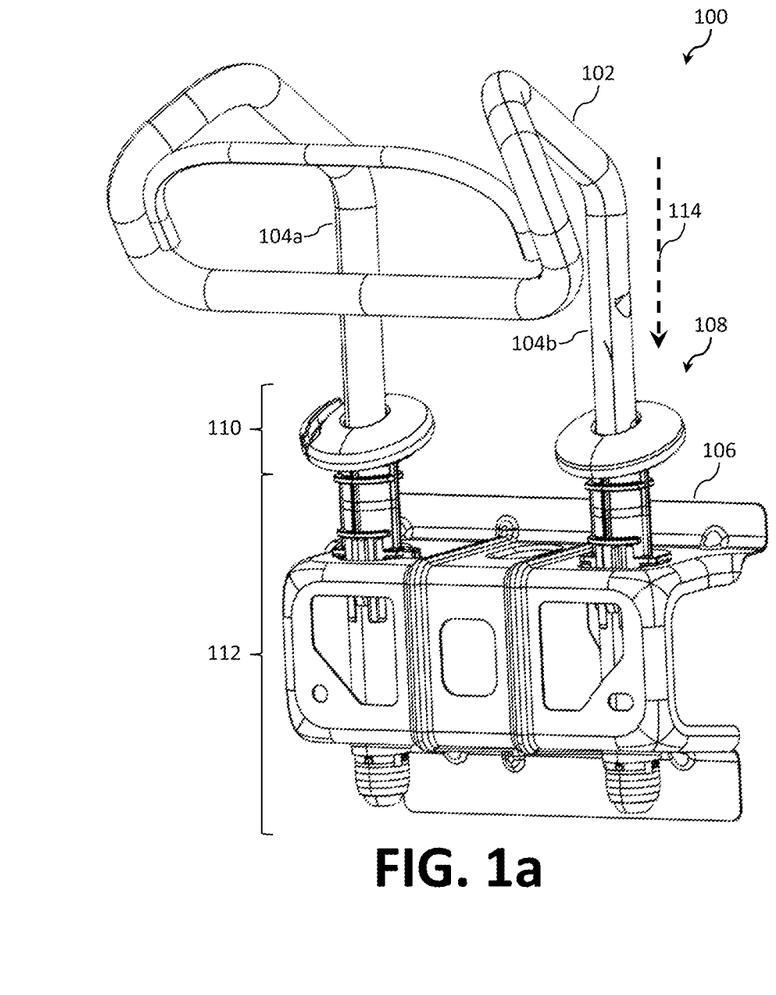
FIGS. 1a and 1b illustrate perspective views of an example seat assembly with a headrest frame in accordance with aspects of this disclosure.
Figure 1B:
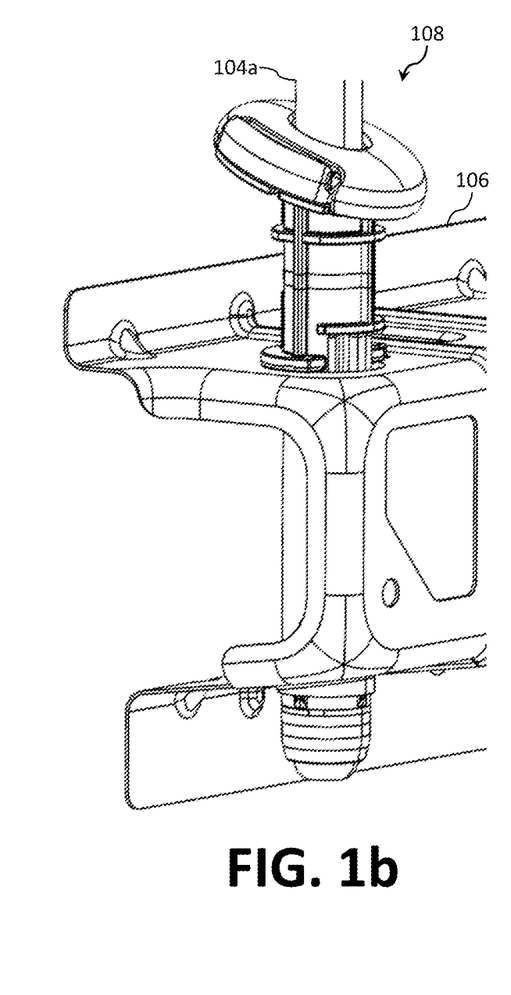
Figure 2A:
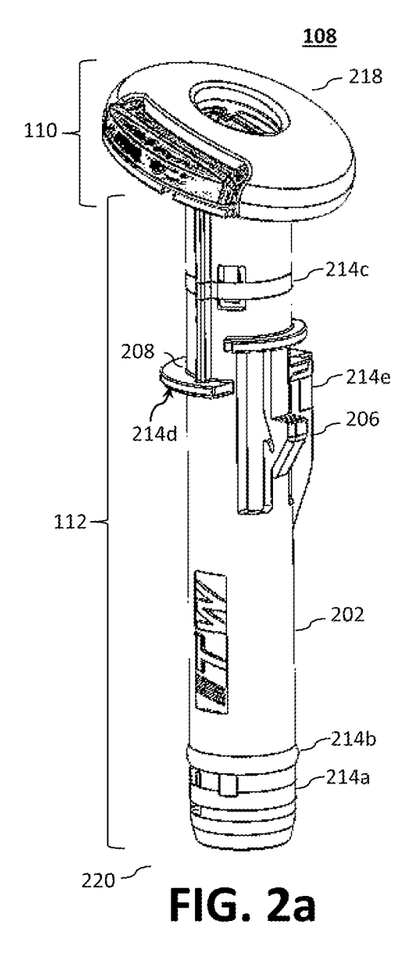
FIGS. 2a through 2d illustrate, respectively, perspective, front, side, and rear elevational views of the sleeve device of FIGS. 1a and 1b.
Figure 2B:
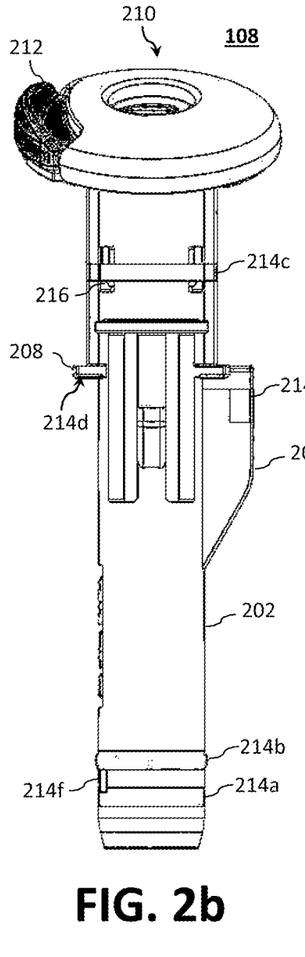
Figure 2C:
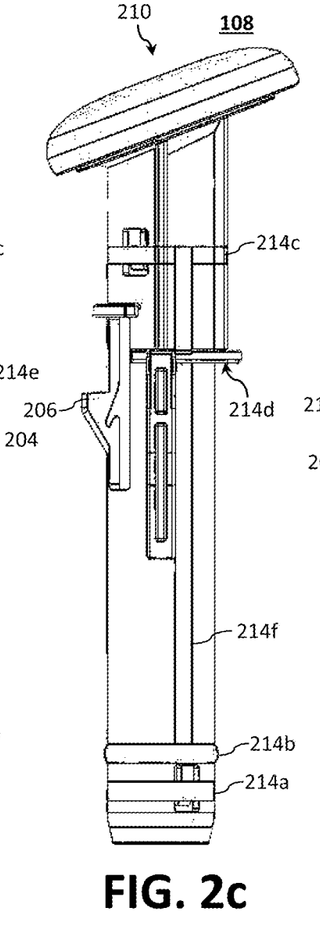
Figure 2D:
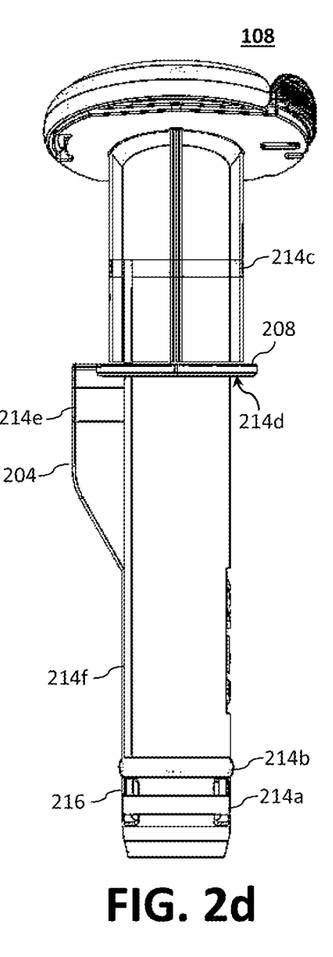

Referring to FIGS. 1a and 1b, a seat assembly 100 is illustrated having a headrest frame 102 (which may be covered or covered in padding and a cover, not shown), a vehicle frame 106, and one or more sleeve devices 108 to couple the headrest frame 102 relative to the vehicle frame 106. As illustrated, the headrest frame 102 may comprise one or more headrest rods 104. In this example, the headrest frame 102 comprises a plurality of headrest rods 104 (i.e., a first headrest rod 104a and a second headrest rod 104b).

Each of the one or more sleeve devices 108 generally comprises a head portion 110 and a sleeve body 112. In use, the sleeve body 112 is inserted into, and generally resides within, the vehicle frame 106 of a seat of a vehicle. The head portion 110 is positioned externally to (or at an exterior surface of) the vehicle frame 106 such that it abuts a top surface of a cushion (not shown) of the seat. In use, the side surfaces and the top surface of the head portion 110 are accessible to a user to allow adjustment.

To secure the headrest frame 102 relative to the vehicle frame 106, each of the plurality of headrest rods 104 is inserted into the sleeve device 108 as indicated by arrow 114 via an opening formed in the head portion 110 such that the rod 104 passes head portion 110 and into the sleeve body 112. As will be discussed, the sleeve body 112 may comprise one or more features to engage and secure the rod 104 relative to the sleeve body 112, such as flex fingers.

FIGS. 2a through 2d illustrate, respectively, perspective, front, side, and rear elevational views of the sleeve device 108 described in connection with FIG. 1. The sleeve device 108 comprises a proximal end 218 (e.g., an upper end) and a distal end 220 (e.g., a lower end). The sleeve device 108 comprises a tubular wall 202, where the head portion 110 is positioned at the proximal end 218 (e.g., at an upper end of the sleeve body 112).

Figure 4A:
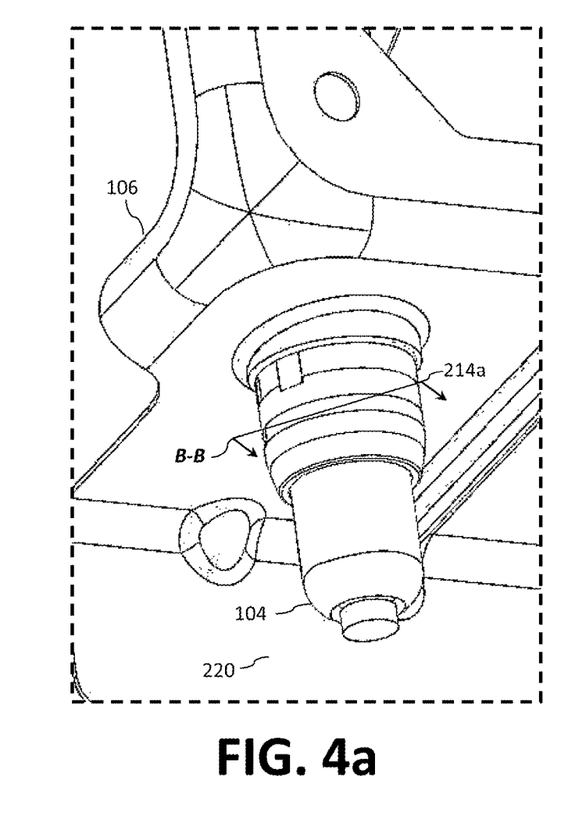

The tubular wall 202 and head portion 110 together define an inner axial passage 210 therein. The inner axial passage 210 is configured to receive a rod 104 of the headrest frame 102. In some examples, the rod 104 passes entirely thought the sleeve device 108 (as illustrated in FIG. 4a). The rod 104 is inserted into the inner axial passage 210, for example, when the sleeve device 108 is located in the vehicle frame 106. The head portion 110 comprises a latching mechanism 212 which engages with the rod 104, such that the rod 104 is moveable along the inner axial passage to set a desired height of the headrest frame 102 relative to the vehicle frame 106. The latching mechanism 212 is preferably accessible to the user when assembled with the vehicle frame 106. In some examples, engaging the latching mechanism 212 releases the rod 104 such than it can be adjusted or removed from the sleeve body 112. An example latching mechanism 212 will be described in connection with FIGS. 5a through 5d.

The sleeve body 112 comprises one or more guides 204 (e.g., illustrated as a key feature) that project radially outwardly from the tubular wall 202 and extend along at least a portion of the length of the sleeve body 112. The one or more guides 204 interact with corresponding slots or features (not shown) located in or on the vehicle frame 106 to orientate and/or secure the sleeve device 108 into the vehicle frame 106. A latch element 206 (e.g., a biased clip) may also be provided to lock the sleeve body 112 within the vehicle frame 106. The sleeve body 112 further comprises a flange 208 extending radially outwardly from the tubular wall 202 and around the circumference thereof. The flange 208 interacts with the vehicle frame 106 to locate and/or secure the sleeve device 108 into the vehicle frame 106. In some examples, the flange 208 abuts a planar portion of the vehicle frame 106. One or more flex fingers 216 may be positioned around the rod 104 to mitigate lateral movement (and resulting BSR) of the rod 104 within the inner axial passage 210.

The sleeve device 108 may be fabricated from one or more plastics. In some examples, the components of the sleeve device 108 are molded using a rigid thermoplastic material. The sleeve device 108 may be molded as a single component or as multiple components. For example, the head portion 110 and/or latching mechanism 212 may be molded in multiple parts and assembled thereafter.

As can be appreciated, when installed, the sleeve device 108 engages the vehicle frame 106 at multiple contact points. Direct contact between the sleeve device 108 and the vehicle frame 106 can result in BSR. To mitigate BSR, one or more elastomeric elements 214 may be provided at each contact point between the sleeve device 108 and the vehicle frame 106. The elastomeric elements 214 may also be provided to inwardly bias the one or more flex fingers 216. To that end, the elastomeric elements 214 may be provided in the form of ribs, rings (i.e., ring-shaped), or other shapes. In the illustrated example, the elastomeric elements 214 include the first ring 214a, a second ring 214b, a third ring 214c, annular element 214d (e.g., disk-shaped), and one or more planar elements 214e; each an elastomeric element 214. While three elastomeric elements 214 are depicted, one or more of the rings 214a, 214b, 214c may be utilized and/or additional elastomeric elements 214 may be utilized at any suitable locations.

As illustrated, each of the first ring 214a, the second ring 214b, and the third ring 214c may be positioned on an exterior surface of the tubular wall 202 around a part or all of the external circumference of the sleeve body 112. As illustrated, the first ring 214a, the second ring 214b, and the third ring 214c may be positioned at different locations along the length of the sleeve body 112. In this example, the first ring 214a and the third ring 214c may be configured to apply an inward force upon flex fingers 216, which, in turn, abuts and secures the rod 104 within the sleeve body 112. The second ring 214b, conversely, maintains contact between the tubular wall 202 and the vehicle frame 106 to mitigate BSR.

The annular element 214d may be provided on a surface of the flange 208 that contacts the vehicle frame 106. In the illustrated example, the surface of the flange 208 that contacts the vehicle frame 106 in an underside surface of the flange 208. The one or more planar elements 214e may be provided on one or more surfaces of the one or more guides 204 that contacts the vehicle frame 106.

The one or more elastomeric elements 214 can be overmolded onto the sleeve device 108. This process is sometimes referred to, in the art, as 2K molding. The elastomeric element 214 can be manufactured using an antifriction resilient and soft plastic material, such as thermoplastic elastomers, thermoplastic polyurethanes, styrene ethyl butylene styrene, or a combination thereof. In some examples, different materials may be used for the elastomeric elements 214 depending on the location. For example, some contact points may justify an elastomeric element 214 that has a different hardness or density. In some example, two or more elastomeric elements 214 may be fabricated as a single component with flash runners 214f joining them. In other examples, the elastomeric elements 214 may be fabricated as separate component, thus avoiding the flash runners 214f and conserving material. For example, with reference to FIGS. 6a through 6c, a multi-gate system (e.g., a dual gate system) may be used to separately form certain elastomeric elements 214 without forming flash runners 214f. As illustrated, certain flash runners 214f are omitted. In other examples, the elastomeric elements 214 may be formed separately and later applied to the sleeve device 108 (e.g., not overmolded). For example, a toric joint (e.g., an O-ring) may be formed and later applied to the sleeve device 108 to serve as one or more of the first ring 214a, the second ring 214b, and/or the third ring 214c. In other examples, elastomeric elements 214 may be formed and later adhered (e.g., using an adhesive or welding). In another example, with reference to FIGS. 7a through 7e, the elastomeric elements 214 may be formed as a wide band 214g formed with or otherwise including one or more protrusions 702 axially situated around the distal end 220.

In use, the sleeve device 108 is inserted into a vehicle frame 106 such that the one or more guides 204 and flange 208 interact with the vehicle frame 106, as described previously. The elastomeric elements 214 may be compressed when the sleeve device 108 is connected to the vehicle frame 106. This compressibility means that the permitted tolerance of interacting parts of the vehicle frame 106 and/or the sleeve device 108 may be increased. The elastomeric elements 214 also provide damping and vibration attenuation between the sleeve device 108 and the vehicle frame 106. This reduces the amount of BSR emitted from the interaction between the sleeve device 108 and the vehicle frame 106.

The resilient material of the elastomeric elements 214 compresses when the sleeve device 108 is inserted in the vehicle frame 106 and when the rod 104 is inserted into the sleeve device 108. This compressibility allows a greater permitted tolerance of the interacting parts of the rod 104 and the sleeve device 108 and of the interacting parts of the sleeve device 108 and the vehicle frame 106. Further, variability in the extent to which the elastomeric elements 214 protrude from the tubular wall 202 or into the inner axial passage 210, and the stiffness of the elastomeric elements 214, allows the tightness of fit between the sleeve device 108 and the rod 104 or the vehicle frame 106 to be optimized to mitigate BSR, while permitting movement of the rod 104 along the inner axial passage 210. As illustrated, the second ring 214b may be sized and shaped to engage the vehicle frame 106 to mitigate BSR. For example, as illustrated, the second ring 214b has a larger outer diameter than the first ring 214a and the third ring 214c.

The compressibility of the resilient material of the elastomeric elements 214 can also increase the comfort of the headrest for the user because the rod 104 is typically manufactured using metal, and vibrations caused due to contact between the metal rod 104 and another hard surface cause the vibrations to travel along the rod 104. By damping this contact, vibrations are not transmitted along the metal rod to a user of the headrest.

Figure 3A:
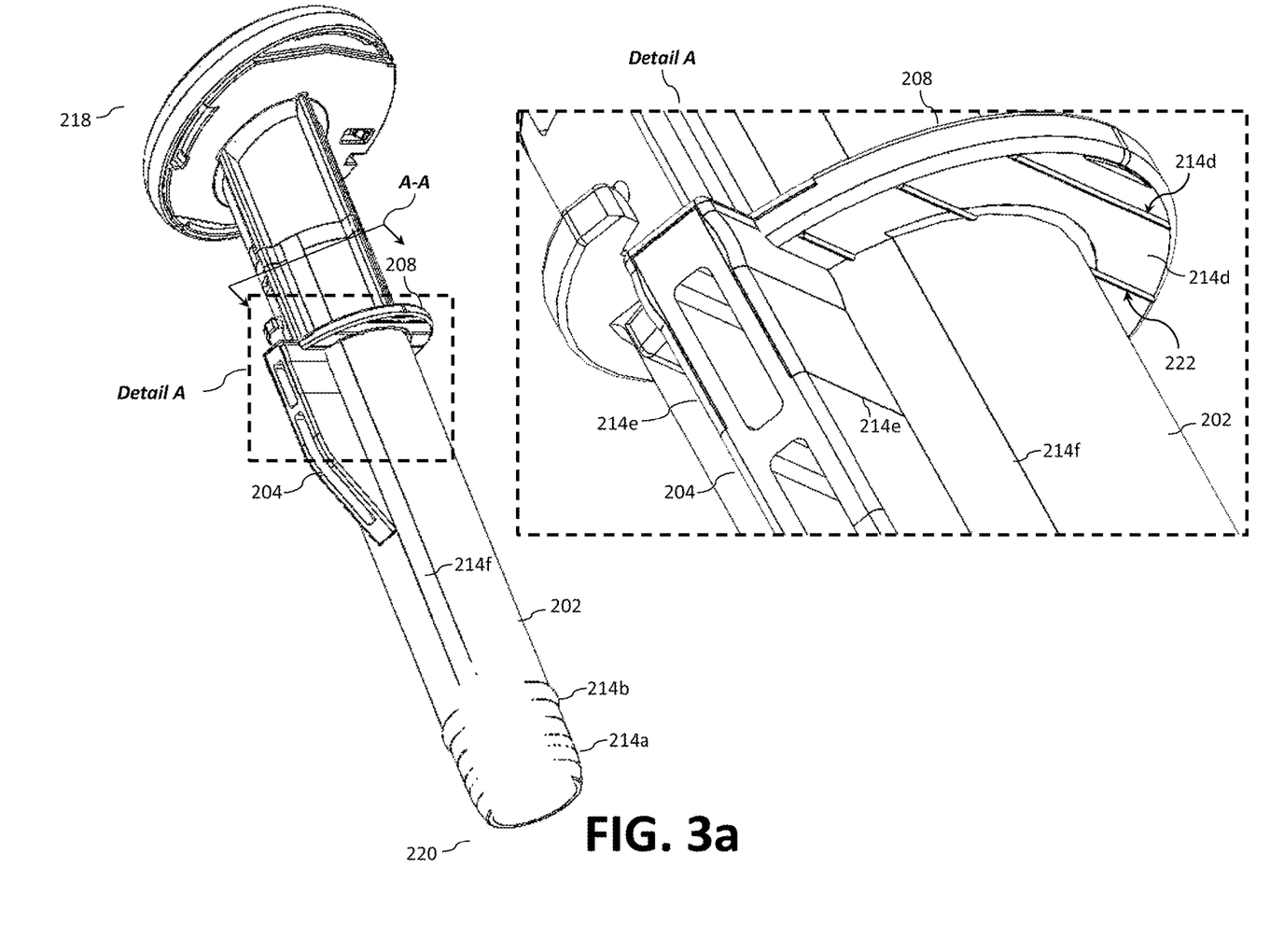
Figure 3B:
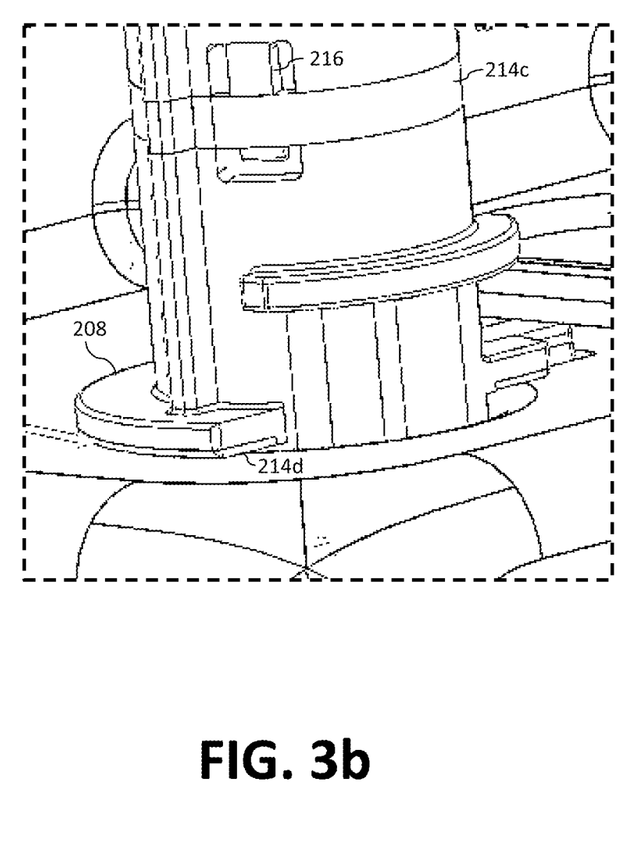
FIGS. 3b and 3c illustrate the contact area between the sleeve device and the vehicle frame.
Figure 3C:
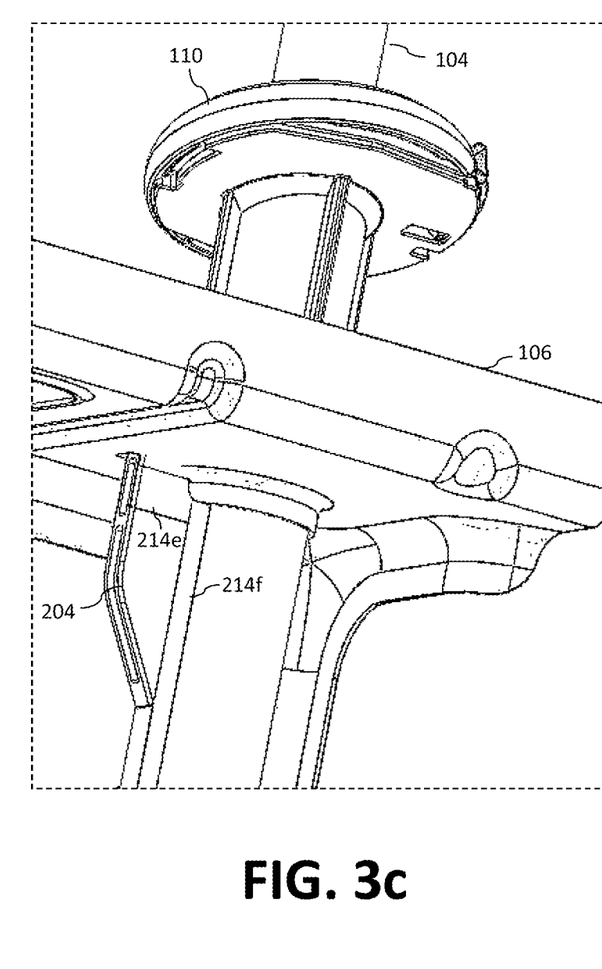
Figure 3D:
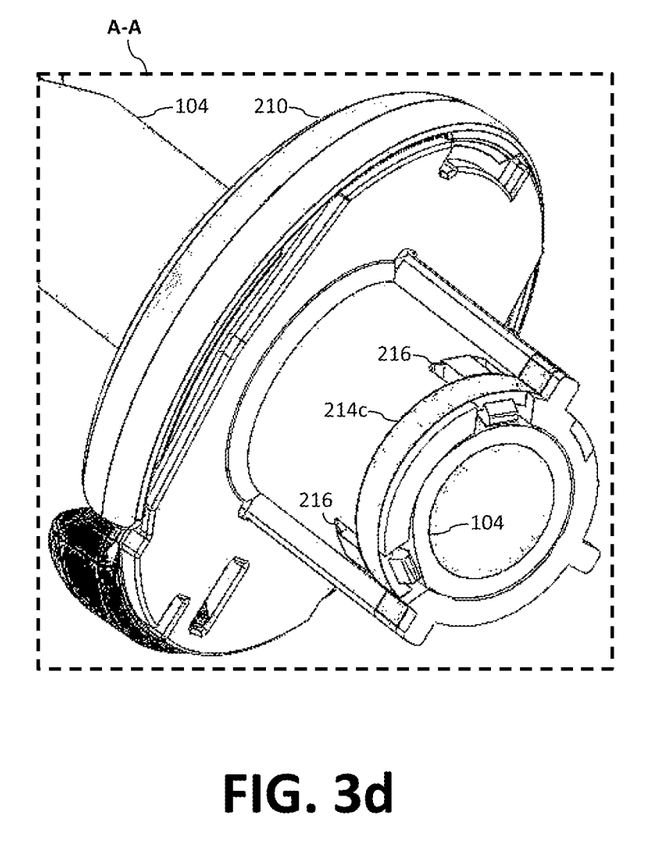
FIG. 3d illustrates a cross-sectional view of the sleeve device.

FIG. 3a illustrates a view of the underside of the sleeve device 108, while FIGS. 3b and 3c illustrate the contact area between the sleeve device 108 and the vehicle frame 106 at the upper end of the sleeve device 108. As illustrated in FIG. 3a, the annular element 214d may further comprise one or more ribs 222 (e.g., crush ribs) that contact a planar portion of the vehicle frame 106, which is best illustrated in Detail A. The one or more ribs 222 serve to further reduce BSR by, inter alia, increasing the distance between the flange 208 and the planar portion of the vehicle frame 106. The one or more planar elements 214e may be provided on each surface of the one or more guides 204 that contacts the vehicle frame 106. In some examples, a single planar element 214e may be wrapped around a portion of a guide 204 (e.g., around an edge or corner of the guide 204). As illustrated in FIGS. 3b and 3c, the annular element 214d and planar elements 214e serve to isolate the sleeve device 108 from the vehicle frame 106 at each contact point. As also illustrated in FIG. 3d, which is a cross-sectional view of the sleeve device 108 taken along cutting plane A-A, the third ring 214c serves to apply an inward force upon one or more flex fingers 216.

Figure 4B:
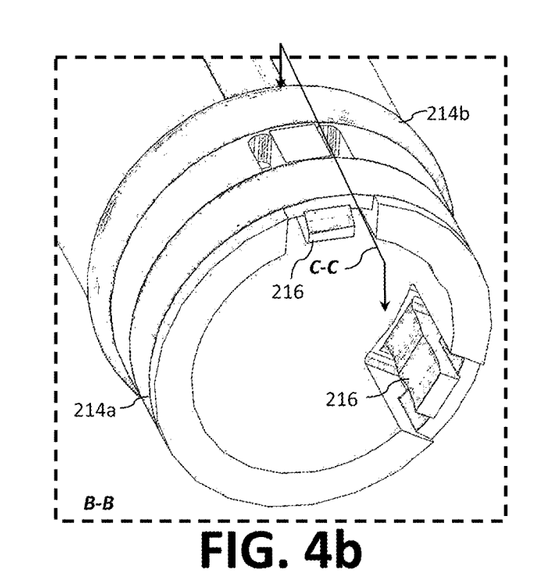
FIGS. 4b and 4c illustrates cross-sectional views thereof.
Figure 4C:
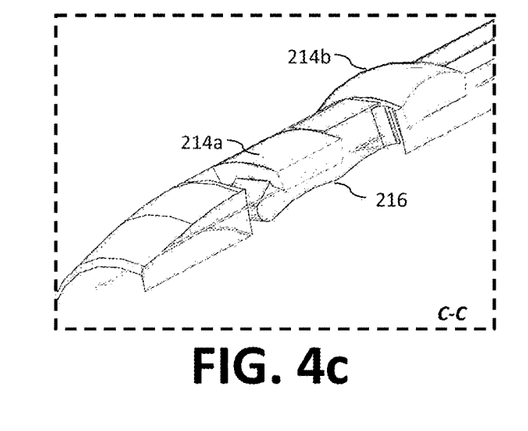

FIG. 4a illustrates a view of the underside of the sleeve device 108 and the vehicle frame 106, while FIGS. 4b and 4c illustrates cross-sectional views thereof. Specifically, FIG. 4b illustrates a cross-sectional view taken along cutting plane B-B of FIG. 4a (with the rod 104 omitted), while FIG. 4c illustrates a cross-sectional view taken along cutting plane C-C of FIG. 4b. As illustrated, the first ring 214a serves to apply a force upon flex finger(s) 216, while second ring 214b serves to contact and engage the vehicle frame 106. As mentioned, the flex finger(s) 216 are biased inwardly and configured to engage the rod 104. There may be one or plural flex fingers 216.

Figure 5A:
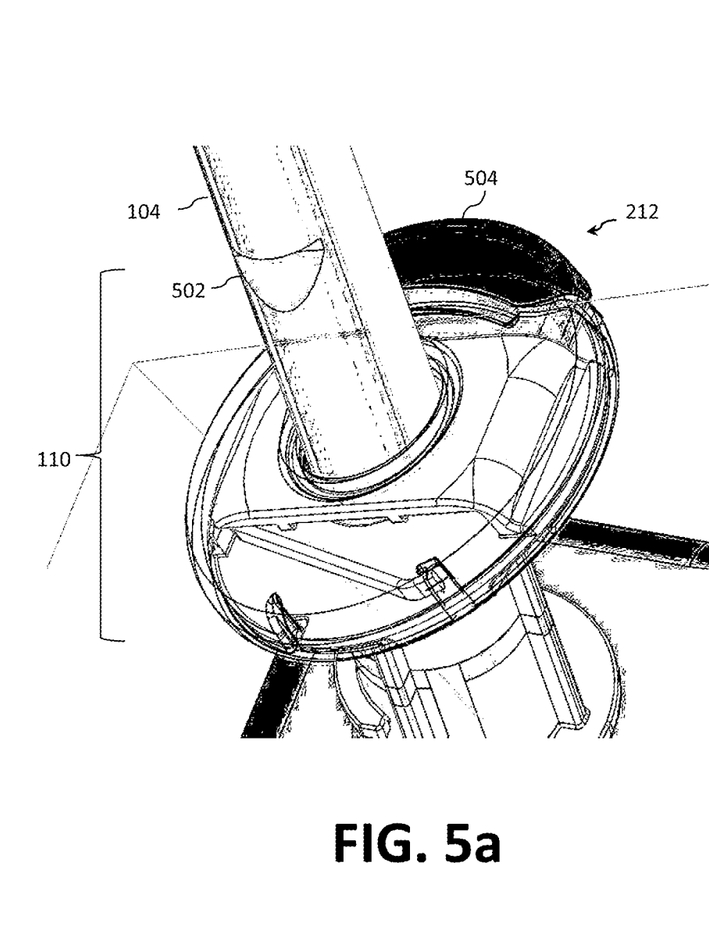
Figure 5B:
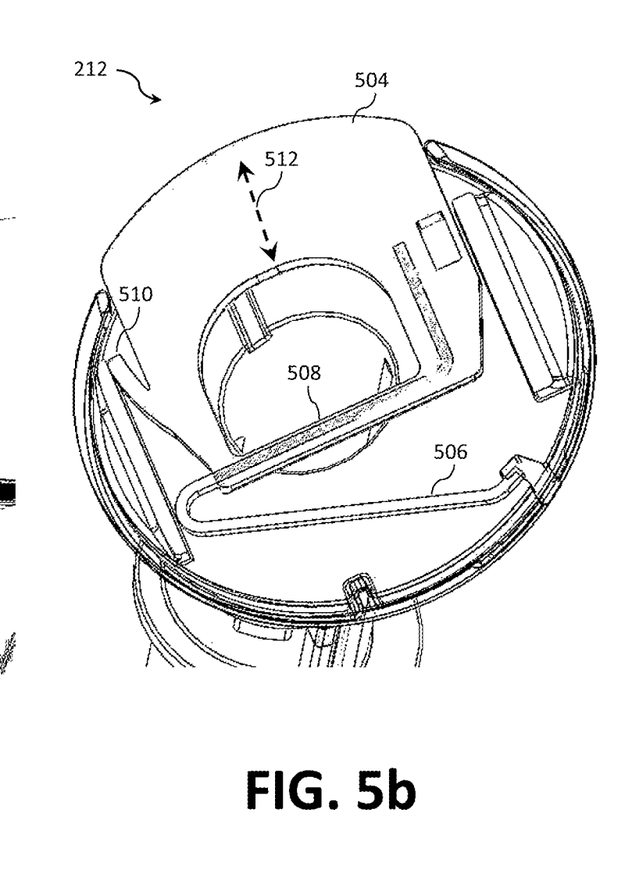
Figure 5C:
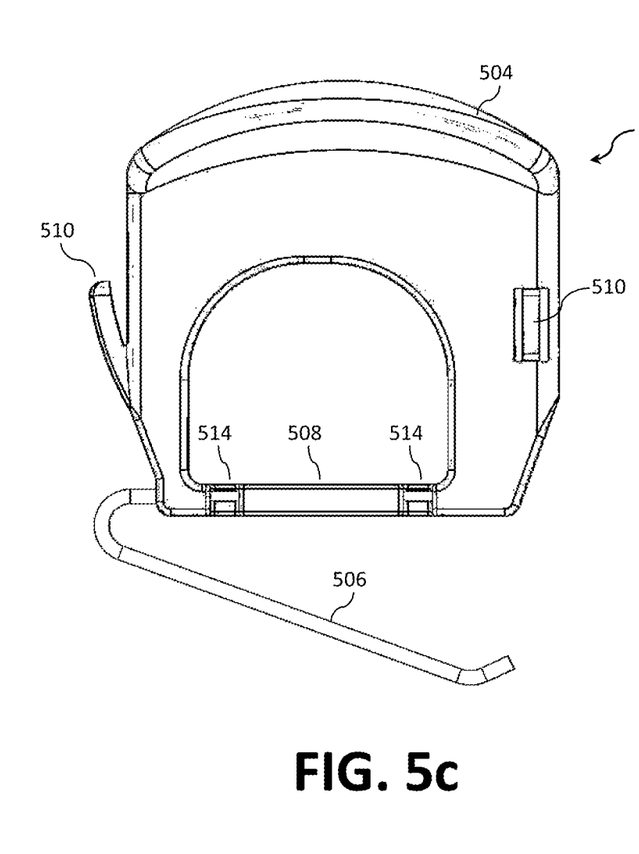
FIGS. 5c and 5d illustrate the latching mechanism removed from the head portion.
Figure 5D:
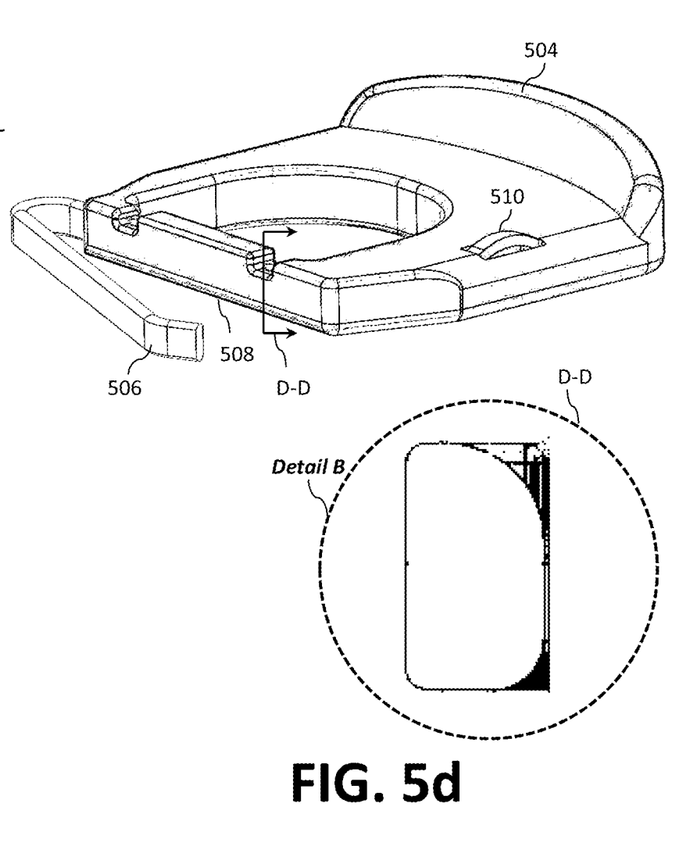

Referring now to FIGS. 5a through 5d, an example head portion 110 with a latching mechanism 212 is shown. Specifically, FIGS. 5a and 5b illustrate assembled views of the latching mechanism 212 in the head portion 110, while FIGS. 5c and 5d illustrate the latching mechanism 212 removed from the head portion 110.

The latching mechanism 212 is generally configured to engage one of a plurality of notches 502 formed along the length of the rod 104, thereby securing the rod 104 in a given position (e.g., height) relative to the seat. The latching mechanism 212 generally comprises a body portion 504 (e.g., a button body) and a spring element 506. The body portion 504 is moveable relative to the head portion 110 and rod 104 as indicated by arrow 512. The body portion 504 comprises a cross member 508 and one or more flexible tabs 510 (e.g., touch points). The cross member 508 is configured to engage one of a plurality of notches 502, while the one or more flexible tabs 510 serve to reduce BSR by dampening contact between the body portion 504 and adjacent surfaces. As illustrated, the cross member 508 may comprise one or more regions 514 with a smaller and/or differently shapes cross sections. A cross-sectional view of an example of such a regions 514 of the cross member 508 is illustrated in at Detail B, which is taken along cutting plane D-D of FIG. 5d.

As illustrated, one flexible tab 510 may be provided on a side of the body portion 504 to limit lateral (side-to-side) movement of the body portion 504, while another flexible tab 510 may be positioned on a top surface to limit vertical (up and down) movement of the body portion 504.

The spring element 506 may be integrated with the body portion 504 during the molding operation. In another example, the spring element 506 may be attached to the body portion 504 afterward (e.g., using adhesive, overmolding, etc.). In either case, the spring element 506 may be a V-spring configured to bias the body portion 504 outwardly (away the rod 104) to urge the cross member 508 into a notch 502. In use, the operator can push the body portion 504 inwardly (toward the rod 104) to overcome the force of the spring element 506 and to thereby release the rod 104 (i.e., pushing the cross member 508 out of the notch 502). The force to overcome the spring element 506 may be, for example, 25 to 35 Newtons (N), or about 30N. The body portion 504 may be fabricated from nylon, or another plastic material, while the spring element 506 may be stainless steel or another metal. In some examples, the spring element 506 may be plastic and formed as part of the body portion 504.

Figure 6A:
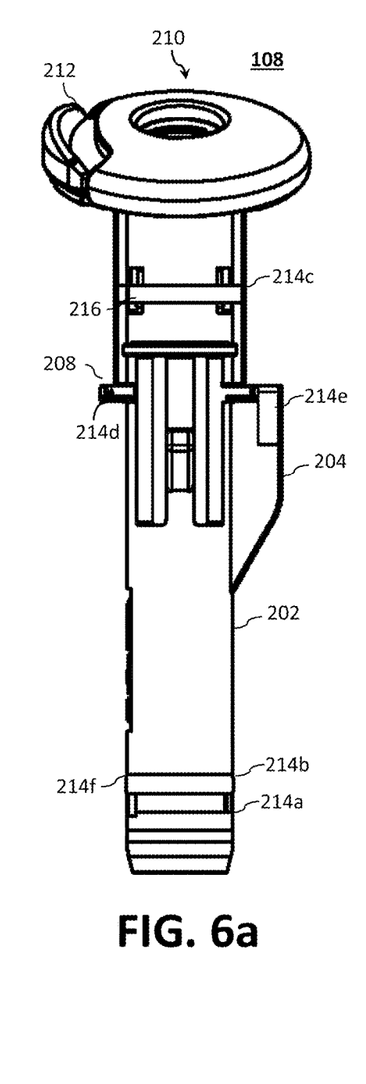
FIGS. 6a through 6c illustrate, respectively, front, side, and rear elevational views of the sleeve device in accordance with other aspects of this disclosure.
Figure 6B:
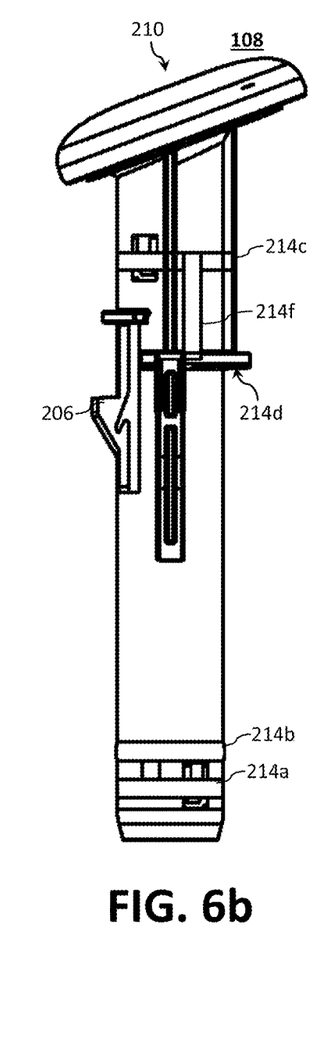
Figure 6C:
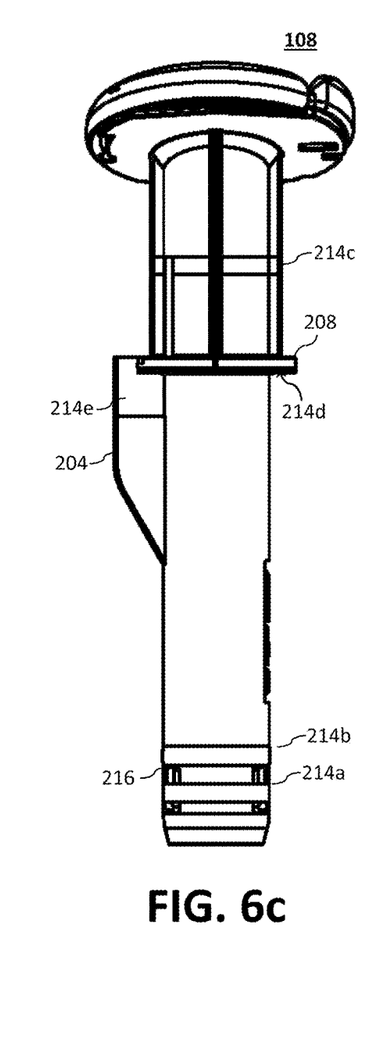

FIGS. 6a through 6c illustrate, respectively, front, side, and rear elevational views of the sleeve device in accordance with other aspects of this disclosure. As noted previously, a multi-gate system (e.g., a dual gate system) may be used to separately form certain elastomeric elements 214 without forming flash runners 214f.

Figure 7A:
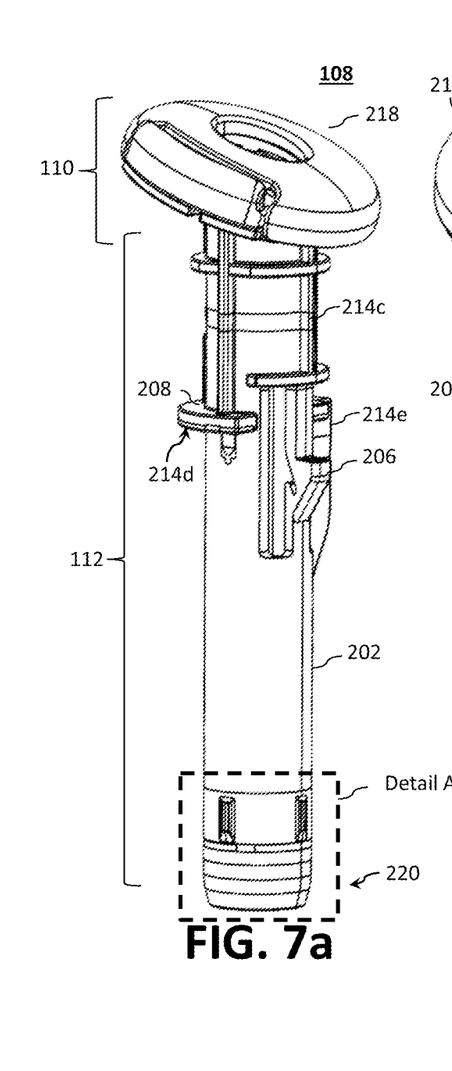
FIGS. 7a through 7d illustrate, respectively, perspective, front, side, and rear elevational views of the sleeve device in accordance with other aspects of this disclosure.
Figures 7B, 7C:
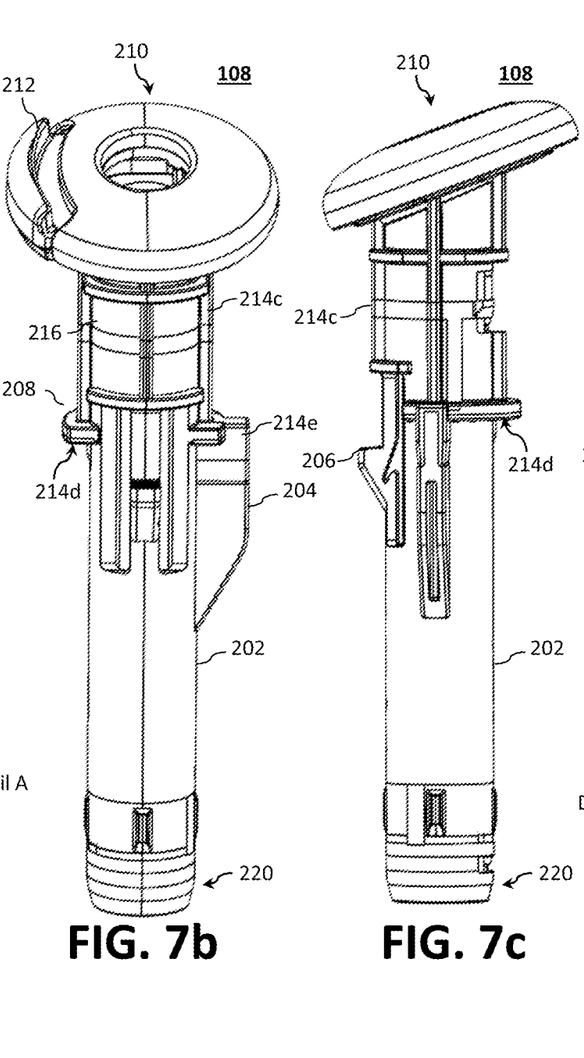
Figure 7D:
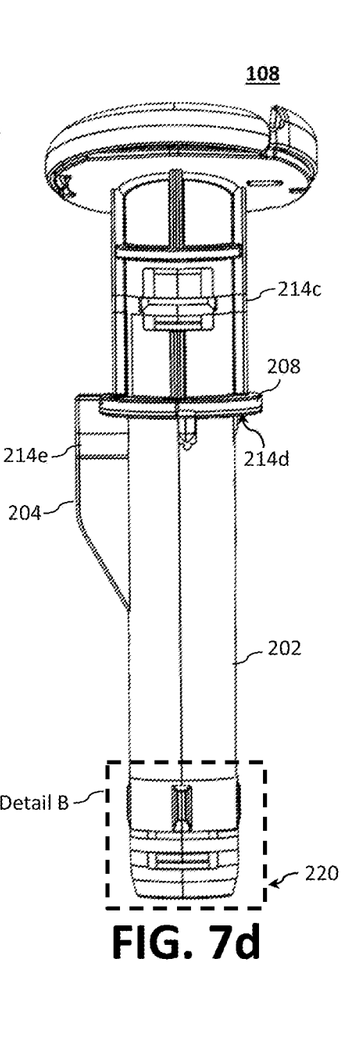
Figure 7E:
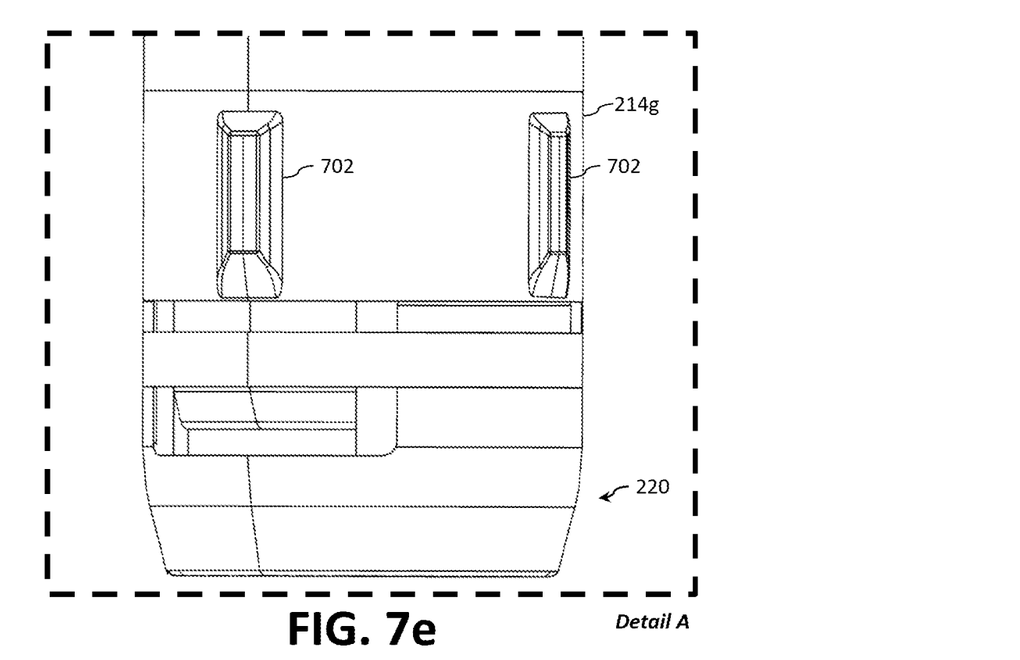
FIGS. 7e and 7f illustrate enlarged views of the distal end of the sleeve device of FIGS. 7a through 7d.
Figure 7F:
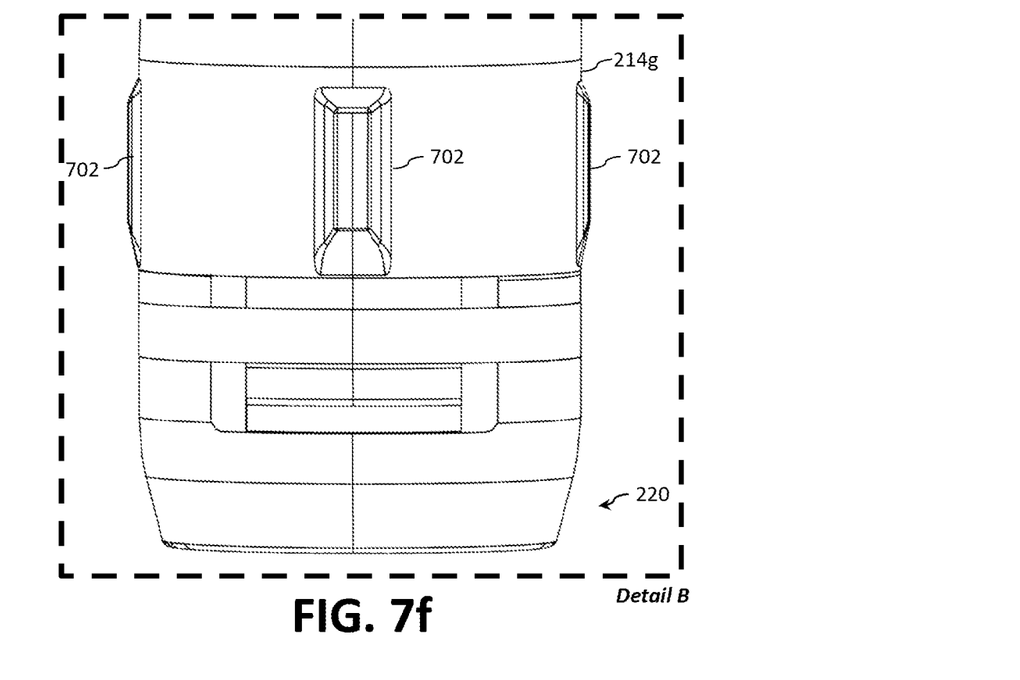

FIGS. 7a through 7d illustrate, respectively, perspective, front, side, and rear elevational views of the sleeve device in accordance with other aspects of this disclosure. FIGS. 7e and 7f illustrate Detail A (FIG. 7a) and Detail B (FIG. 7d) of the distal end 220. As illustrated, the elastomeric elements 214 may be formed as a wide band 214g formed with or otherwise including one or more protrusions 702 axially situated around the distal end 220.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A sleeve device for a headrest comprising a sleeve body for insertion into a vehicle frame of a vehicle seat, the sleeve body comprising:
   a tubular wall defining an inner axial passage configured to receive a rod of the headrest;
   a guide extending from the tubular wall and extending along at least a portion of a length thereof;
   one or more flex fingers positioned to contact the rod within the inner axial passage of the tubular wall; and
   a plurality of elastomeric elements positioned on an outer surface of the sleeve device, wherein at least one of the plurality of elastomeric elements is positioned on the tubular wall and configured to apply an inward force upon the one or more flex fingers to bias the one or more flex fingers inwardly against the rod when the rod is within the inner axial passage.

2. The sleeve device according to claim 1, wherein at least one of the plurality of elastomeric elements is positioned on the tubular wall and configured to engage the vehicle frame when assembled.

3. The sleeve device according to claim 1, wherein at least one of the at least one elastomeric elements positioned on the tubular wall and configured to apply the inward force upon the one or more flex fingers is a ring-shaped elastomeric element.

4. The sleeve device according to claim 1, further comprising an annular elastomeric element, wherein the sleeve body comprises a flange, wherein the annular elastomeric element is positioned on the flange and configured to engage the vehicle frame when assembled.

5. The sleeve device according to claim 1, further comprising a head portion located at an end of the tubular wall, the head portion extending radially outwardly from the tubular wall and configured to engage with the rod.

6. The sleeve device according to claim 5, wherein the head portion engage with the rod via a latching mechanism having a body portion and a spring element.

7. The sleeve device according to claim 6, wherein the body portion comprises one or more flexible tabs.

8. The sleeve device according to claim 7, wherein the one or more flexible tabs comprises a first flexible tab configured to limit lateral movement and a second flexible tab configured to limit vertical movement.

9. The sleeve device according to claim 1, wherein at least one of the plurality of elastomeric elements comprises one or more protrusions.

10. The sleeve device according to claim 9, wherein the one or more protrusions are axially situated around the tubular wall.

11. The sleeve device according to claim 9, wherein the one or more protrusions are situated at a distal end of the tubular wall.

12. The sleeve device according to claim 1, wherein at least one of the plurality of elastomeric elements is overmolded on to the outer surface of the sleeve device.

13. The sleeve device according to claim 1, wherein at least one of the plurality of elastomeric elements is adhered to the outer surface of the sleeve device.

14. The sleeve device according to claim 1, wherein:
the plurality of elastomeric elements includes a first elastomeric element and a second elastomeric element; and
the first elastomeric element is situated at a distal end of the tubular wall.

15. The sleeve device according to claim 14, wherein the sleeve body comprises a flange and wherein the second elastomeric element is positioned on the flange and configured to engage the vehicle frame when assembled.

16. The sleeve device according to claim 1, wherein the at least one of the at least one elastomeric elements positioned on the tubular wall and configured to apply the inward force upon the one or more flex fingers comprise a first ring-shaped elastomeric element positioned at a distal end of the tubular wall.

17. The sleeve device according to claim 16, the at least one of the at least one elastomeric elements positioned on the tubular wall and configured to apply the inward force upon the one or more flex fingers further comprise a second ring-shaped elastomeric element positioned above the guide.

18. The sleeve device according to claim 1, the at least one of the at least one elastomeric elements positioned on the tubular wall and configured to apply the inward force upon the one or more flex fingers comprise a first ring-shaped elastomeric element positioned above the guide.

19. A sleeve device for a headrest comprising a sleeve body for insertion into a vehicle frame of a vehicle seat, the sleeve body comprising:
a tubular wall defining an inner axial passage configured to receive a rod of the headrest; and
a plurality of elastomeric elements, wherein:
the sleeve body comprises a flange;
at least one of the plurality of elastomeric elements is positioned on the flange and configured to engage the vehicle frame when assembled;
at least one of the plurality of elastomeric elements is positioned on an outer surface of the sleeve device; and
at least one of the plurality of elastomeric elements comprises a plurality of crush ribs.

20. A sleeve device for a headrest comprising a sleeve body for insertion into a vehicle frame of a vehicle seat, the sleeve body comprising:
a tubular wall defining an inner axial passage configured to receive a rod of the headrest, wherein the sleeve body comprises a distal end and a flange extending from the tubular wall and comprising an annular surface configured to face a planar portion of the vehicle frame;
a first elastomeric element overmolded on the annular surface of the flange and comprising one or more ribs extending away from the annular surface configured to engage the vehicle frame when assembled;
a second elastomeric element overmolded on the distal end and configured to engage the vehicle frame when assembled.

\* \* \* \* \*